United States Patent

[11] 3,630,089

| [72] | Inventor | Robert D. Bissell |
| | | Orange, Conn. |
| [21] | Appl. No. | 17,838 |
| [22] | Filed | Mar. 9, 1970 |
| [45] | Patented | Dec. 28, 1971 |
| [73] | Assignee | Dresser Industries, Inc. |
| | | Dallas, Tex. |

[54] PRESSURE VENTING INSTRUMENT CASING ASSEMBLY
11 Claims, 5 Drawing Figs.

[52] U.S. Cl. ............................................. 73/431,
 73/416
[51] Int. Cl. ............................................. G01l 19/14
[50] Field of Search............................................. 73/431,
 416; 220/44 R, 82 R, 46 P

[56] References Cited
UNITED STATES PATENTS
3,527,102  9/1970  Harland........................ 73/431

| 3,298,557 | 1/1967 | Ingham...................... | 220/44 R |
| 2,701,964 | 2/1955 | Argabrite ................... | 73/431 X |
| 3,114,467 | 12/1963 | Montgomery............... | 220/44 R |
| 3,388,601 | 6/1968 | Ingham...................... | 73/416 X |
| 2,829,796 | 4/1958 | Dieny........................ | 220/44 |
| 3,138,028 | 6/1964 | Perkins...................... | 73/416 |

*Primary Examiner*—Louis R. Prince
*Assistant Examiner*—Daniel M. Yasich
*Attorneys*—Robert W. Mayer, Thomas P. Hubbard, Jr., Daniel Rubin, Raymond T. Majesko, Roy L. Van Winkle, William E. Johnson, Jr. and Eddie E. Scott ABSTRACT: An instrument casing assembly for pressure gauges and the like providing controlled venting to atmosphere in event of overpressure buildup within the casing. Case engagement against the crystal exterior at selectively displaced peripheral locations compresses a resilient gasket to effect a watertight sealed enclosure. In the event of overpressure buildup from within, those crystal periphery portions intermediate locations held by the case flex outwardly to release the gasket seal thereat sufficiently to effect pressure venting.

PATENTED DEC 28 1971    3,630,089
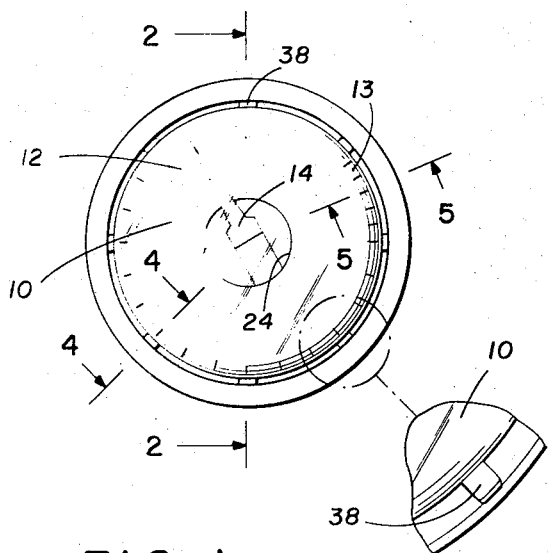
FIG. 1
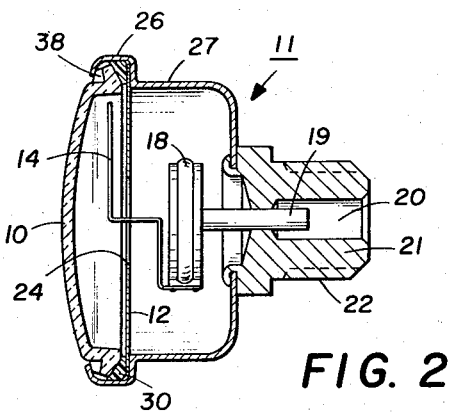
FIG. 2
FIG. 3
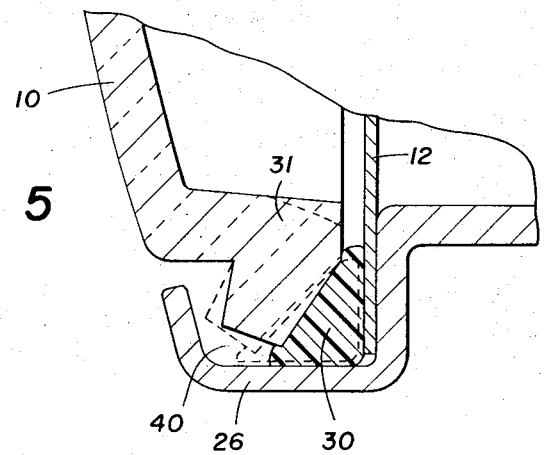
FIG. 5
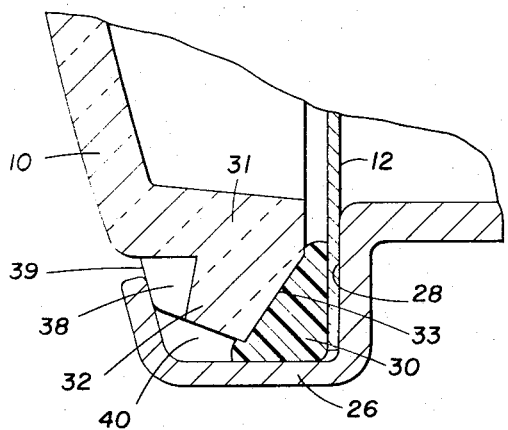
FIG. 4
INVENTOR
ROBERT D. BISSELL
ATTORNEY

PRESSURE VENTING INSTRUMENT CASING ASSEMBLY

BACKGROUND OF THE INVENTION

1. The field of art to which the invention pertains includes the art of instrument casing constructions adapted for venting of internal overpressure.

2. Instruments for the measuring and/or controlling of space conditions such as temperature or pressure are commonly subject to wide variations of internal pressures as a function of the system conditions to which it is intended to respond. Typically a pressure gauge employs a Bourdon tube movable in response to pressure changes and in which internal pressure received from the system being sensed is normally contained. Should the Bourdon tube incur inservice failure in the form of a pressure leak, system pressure intended to be contained can quickly fill and even explode the case or crystal. Since such a possibility represents a safety hazard to equipment and personnel in the area, it is common to provide a form of venting to prevent buildup and avoid flying fragments from an explosion which could otherwise result. Venting structures of various forms for gauge casings and the like are well known and are in wide commercial use as exemplified by U.S. Pat. Nos. 3,298,557; 3,388,601; and 3,434,330.

Because of the wide and extensive commercial use of such instruments, they are marketed by many manufacturers with a high order of price competition. Consequently, each gauge manufacturer constantly strives for minimum product cost frequently achieved by designs and production techniques which result in substantial savings in labor and/or materials. While venting structures of the aforementioned patents have themselves functioned well for the instruments with which they have been employed, cost reduction in the venting structure itself or an improved vent structure designed to accommodate and otherwise cost reduced instrument can contribute substantially to the commercial success of the article of which it is a part.

SUMMARY

The invention relates to a novel instrument casing assembly providing for venting of internal overpressure. More specifically, the invention relates to an instrument casing assembly having a highly effective vent structure capable of use with mass produced small diameter gauges on the order of 1-inch face diameters. Not only does the casing assembly in accordance herewith economically achieve the desired venting feature, but incident thereto it eliminates the need for a bezel ring as commonly employed in the prior art for assembling a crystal to its case. This latter feature affords the advantage of further cost reduction to the overall assembly.

It is therefore an object of the invention to provide a novel and improved casing structure capable of venting an excess pressure from within the casing.

It is a further object of the invention to provide a novel and improved venting structure for a gauge assembly otherwise constructed as a waterproof and dustproof enclosure.

It is a still further object of the invention to provide a novel venting structure for an instrument casing as in the aforementioned objects which is highly effective yet is capable of use with small gauge diameters at very minimal production cost.

BRIEF DESCRIPTION OF THE DRAWINGS

FIG. 1 is a front face view of a pressure gauge instrument constructed in accordance herewith;

FIG. 2 is a sectional view taken substantially along the lines 2—2 of FIG. 1;

FIG. 3 is an enlarged fragmentary view of the encircled portion of FIG. 1;

FIG. 4 is a partial enlarged section as taken substantially along the lines 4—4 of FIG. 1; and FIG. 5 is a partial enlarged section taken substantially along the lines 5—5 of FIG. 1.

Referring now to FIGS. 1 and 2, the casing assembly in accordance herewith includes a transparent crystal 10 of suitably pliable material mounted as will be described to the open end of a cup-shaped, shell-like case 11 and which together cooperate to enclose the working components of an instrument. As here shown, the working components may by way of example, be that of a pressure gauge intended to be responsive to variations of pressure conditions being sensed and for which there is provided a Bourdon tube 18. Spaced opposite the crystal so as to be visible from the front of the instrument is a dial plate 12 having graduations 13 with which a pointer 14 cooperates to indicating values of pressure received at the instrument.

For receiving pressure to be sensed, the Bourdon tube 18 has an open receiving end 19 secured in a bore 20 of a socket 21 threaded at 22 for mounting into a threaded well suitably provided in the system in which it is to be installed. The pointer 14 may for example, be operably connected directly to the movable end of the Bourdon tube as disclosed in U.S. Pat. No. 3,357,394. From the point of connection, the pointer extends upward and then offset through centrally located dial aperture 24 from where it extends radially to a terminal end opposite the graduations.

To accommodate and support the components for effecting the seal and vent structure in accordance herewith, reference is also made to the remaining FIGS. in which case 11 is shown comprised of a front section 26 and a rear section 27 connected by a radially extending annular step or ledge 28. Dial plate 12 rests and is urged directly against the ledge by an axial component of a compressive force exerted against an annular resilient gasket 30, wedge shaped, rectangular or circular in cross section.

For compressing gasket 30, sidewalls of crystal 10 terminate in sort of an annular ridge 31 including an integrally formed radial extension or flange 32. On the underside of flange 32 is a bevel surface 33 engaging against the contiguous wedge side surface of gasket 30. By this means an axially applied force against the crystal will divide into both axial and radial components from the gasket for reasons as will be understood. Located angularly displaced about the top peripheral edge of flange 32 are a plurality of individual rises, bumps, or projections 38 extending radially inward from the rim of supporting flange 32 and each of which have a top surface 39 sloping generally parallel with the front concave surface of crystal 10.

Enveloping gasket 30 and flange 32 so as to provide a clearance 40 is the front end 26 of case 11 being of a readily crimped and preferably corrosion resistant material such as commercially available grades of stainless steel or the like. The enlarged front case portion extends forward beyond flange 32 and where directly opposite a projection 38 is bent or crimped downward thereagainst as to force and secure the crystal against underlying gasket 30. While those case portions at a projection 38 are crimped downward, the remaining case periphery intermediate projections 38 can terminate in a generally upstanding manner or likewise be crimped as shown without any direct engagement against the crystal per se. By the case being forced against the crystal projections, the effect is to place the entire gasket under compression forced rearward and outward against the case to close the clearance 40 and form a seal relation thereabout.

In the event of an overpressure within the casing, the crystal being of a flexible material, such as one of the well-known plastic compositions, will flex outward in the unsecured peripheral areas intermediate projections 38. Simultaneously, compressive restraint against the immediate corresponding and underlying areas of gasket 30 is relieved permitting gasket movement into clearance space 40 as shown dashed in FIG. 5. While this latter situation exists, the seal at the relieved gasket portion is released to gradually vent pressure from within. When venting is completed the crystal reverts to its former condition and the original watertight seal relation of the components is immediately restored.

In operation, a gauge assembly as hereinbefore described is inserted in a system in which pressure is to be sensed. Under normal conditions of service the casing assembly will provide a dusttight and watertight construction as to maintain the internal working components clean and free of moisture. On an excess pressure being encountered within the casing, the peripheral portions of the crystal intermediate projections 38 will be caused to flex outwardly resulting in a consequent release of the gasket seal thereat sufficient to effect required venting.

By the above description there is disclosed an instrument casing assembly providing a novel safety construction for the venting of internal overpressure by a combination of simple but effective features which lends itself to high-volume production at minimum production cost. Not only is such a construction as herein described less costly to produce than other similar constructions of the prior art, but it lends itself to extremely small gauge constructions on the order of 1 inch and less and which are normally difficult to manufacture. Moreover, by means of the instant construction, the need for bezel rings as in the prior art to assembly crystal to case is eliminated further contributing to a significant cost saving.

Since many changes could be made in the above construction and many apparently widely different embodiments of this invention could be made without departing from the scope thereof, it is intended that all matter contained in the drawings and specifications shall be interpreted as illustrative and not in a limiting sense.

The embodiments of the invention in which an exclusive property or privilege is claimed are defined as follows:

1. An instrument casing assembly comprising:
 a. a generally cup-shaped shell-like case;
 b. an annular ledge radially extending interior of said case;
 c. an annular gasket of resilient material generally overlying said ledge;
 d. a crystal capable of being flexed and received in the front end of said case and having an axially extending ridge about its periphery engaging against said gasket; and
 e. case means extending integral of said case effecting bezelless engagement against spaced front portions of said crystal at predetermined spaced locations about the crystal periphery to place the crystal in compressing relation against said gasket and form a seal engagement thereabout, said seal engagement being effective in the absence of an overpressure within said case to maintain a generally dusttight seal thereabout and being effective in response to an overpressure within said case to release said seal engagement at crystal areas intermediate said locations at which said crystal is engaged by said case means.

2. A casing assembly as in claim 1 which said case includes a rear portion and relatively larger diameter front portion in which to receive said crystal, and said ledge comprises a radially extending wall of said case connecting said front and rear case portions.

3. A casing assembly as in claim 1 in which an annular clearance is provided between the peripheral exterior of said crystal and the interior case wall thereat, said clearance being sufficient in response to an internal overpressure to permit outward flexing of said crystal at said intermediate areas.

4. A casing assembly as in claim 3 in which a dial plate is secured between said gasket and said ledge.

5. A casing assembly as in claim 3 in which said crystal ridge includes an integral annular flange extending radially outward and frontward extending projections on said flange defining said predetermined spaced locations at which to receive said bezelless engaging case means.

6. A casing assembly as in claim 5 in which said case means is crimped against said projections to effect engagement against said crystal.

7. A casing assembly as in claim 5 in which the engaging surfaces between said flange and gasket divide a force applied axially from said case against said crystal into axial and radial components.

8. A casing assembly as in claim 7 in which said gasket engaging flange surface at least partially includes an annular bevel sloping frontward towards its periphery.

9. A casing assembly as in claim 8 in which said gasket is wedge shaped in cross section and provides an engaging surface which is generally parallel to said bevel surface.

10. An instrument casing assembly comprising:
 a. a generally cup-shaped shell-like case;
 b. an annular ledge radially extending interior of said case;
 c. an annular gasket of resilient material generally overlying said ledge, said gasket having an engaging surface which at least partially includes an annular bevel sloping frontward towards its periphery to divide an axially applied force thereagainst into axial and radial components;
 d. a crystal capable of being flexed and received in the front end of said case peripherally spaced therefrom to define an annular clearance therebetween and having an axially extending ridge about its periphery engaging against the engaging surface of said gasket, said ridge including an integral annular flange extending radially outward and having frontward extending projections thereon; and
 e. means on said case engaging the flange projections of said crystal to axially place the crystal in compressing relation against said gasket and form a seal engagement thereabout, said seal engagement being effective in the absence of an overpressure within said case to maintain a generally dusttight seal thereabout and being effective in response to an overpressure within said case to release said seal engagement at crystal areas intermediate said projections at which said crystal is engaged by said case means to permit said intermediate crystal areas to flex outwardly into said clearance.

11. A casing assembly as in claim 10 in which said gasket is wedge shaped in cross section and provides a second engaging surface which is generally parallel to said bevel engaging surface.

* * * * *